July 25, 1961 C. JOHNSON 2,993,511
SOLENOID OPERATED VALVE AND SOLENOID ASSEMBLY
Filed June 17, 1955 5 Sheets-Sheet 1

INVENTOR
CLARENCE JOHNSON
BY Strauch, Nolan & Diggins
ATTORNEYS

July 25, 1961 C. JOHNSON 2,993,511
SOLENOID OPERATED VALVE AND SOLENOID ASSEMBLY
Filed June 17, 1955 5 Sheets-Sheet 4

Fig. 7

INVENTOR
CLARENCE JOHNSON

BY Strauch, Nolan & Diggins
ATTORNEYS

United States Patent Office 2,993,511
Patented July 25, 1961

2,993,511
SOLENOID OPERATED VALVE AND SOLENOID ASSEMBLY
Clarence Johnson, 1804 Green Road, South Euclid, Ohio
Filed June 17, 1955, Ser. No. 516,245
12 Claims. (Cl. 137—623)

The present invention relates to valves and more particularly to solenoid-controlled pilot-operated valves particularly adapted for use in conjunction with fluid motors, as in servo-motor systems. This application is a combination-in-part of, and an improvement on the valve of my copending application Serial No. 348,942 filed April 15, 1953, now Patent 2,912,007.

A large percentage of modern industrial production equipment is automatic or semi-automatic in operation and requires the application of forces susceptible of delicate control as to direction, duration, etc. As a result, much of such equipment embodies servo-motor systems requiring valve controls for the supply and exhaust of hydraulic or pneumatic pressure to a fluid motor, for example, a piston and cylinder for performing useful work. Many valve controls for this purpose employ a solenoid to operate the control valve either directly or through the intermediary of a pilot valve.

The solenoid-controlled valves, then, perform the overall function of converting electrical impulses to mechanical movement of a valve which, in turn controls the supply of oil or air, under pressure, to a servo-motor. Since modern production machines are, in many instances an assembly of smaller machines and mechanisms interlocked and synchronized electrically to control the generation of large forces, no system is more reliable than its solenoid operated control valves. If one valve becomes inoperative for one reason or another, the element it controls will fail to function causing malfunctioning of the entire machine with concomitant wrecking of tools and spoiling of work.

The most important difficulties encountered in present day solenoid valves are their tendencies to fall apart due to hammer action of the solenoid, to stick, and, in sticking, to burn out the solenoid. In regard to falling apart, the constant hammering and shock effect of the solenoid causes pins, screws and nuts to crystallize, fracture, or loosen and fall out.

Solenoid valves may be classified as direct acting or pilot operated. In the former, the solenoid is kinematically linked directly to the control valve stem and, therefore, must be large and powerful enough to overcome a return force conventionally supplied by a spring and the friction of the valve and also must have a stroke equal to the length of travel of the valve or its control stem. Solenoids adapted for this type of service, then are necessarily large, powerful, and expensive, the large size and high power increasing the shock effect and tendency toward destruction of the valve operated thereby and requiring a heavy current and unnecessarily heavy relays merely to overcome the initial resistance to movement.

In the case of pilot-operated solenoid valves, however, the solenoid actuates a small pilot valve which, in turn, controls the main valve. This reduces the size of the solenoid required but the packing customarily used on conventional sliding pilot valves soon acquires gummy surfaces causing the pilot valve to stick.

The foregoing difficulties are compounded by the fact that the main valve is usually spring-returned, causing the valve stem to cock and, because of the well-known characteristics of springs, the return force is not uniform, being at a maximum when the spring is fully compressed or extended.

An additional shortcoming of prior art solenoid valves is that many are designed to require extremely close tolerances in their construction thus rendering them not only more difficult and expensive to manufacture, but also more vulnerable to misuse encountered in general industrial applications.

The present invention contemplates valves, particularly but not exclusively adapted to operation by pilot valves and especially but again, not exclusively, by pilot valves which are solenoid actuated. More specifically, the invention comprises a main valve which may be fluid actuated in both directions and controlled by a double-acting ball-type pilot valve, preferably operated by a solenoid although, as the description proceeds it will be seen that other means of operating the pilot may be employed.

In my aforementioned Patent 2,912,007, I have disposed novel valve inventions which effectively solve the above-discussed problems and have many advantages over the prior art. The inventions therein disclosed provide low-cost, long-life, easily serviced valves that will not stick or fall apart in service. The valves disclosed in that application embody replaceable O-ring seals of resilient material which eliminate the necessity of close fits and tolerances, and also incorporate a novel sealing ring seating arrangement whereby the rings will not blow out of their seats under pressure. They incorporate dual purpose screens serving both as valve structural elements and as screens or filters; and have a flow control element which is fluid operated in both directions and therefore will not cant or cock. The valves disclosed in that application further embody a new improved solenoid pilot valve control arrangement and are easily convertible to various types of operation, such as two way solenoid or one way solenoid. The foregoing advantages of the valves disclosed in my earlier application are incorporated in the new improved valves of the present invention, and, in addition, further advantages and new improved results are achieved by the present invention as will hereinafter appear.

It is a principal object of the present invention to provide a valve unit having a new improved valve control unit, and more particularly a pilot control arrangement which includes an exhaust path cooperating with the exhaust of the main valve body to permit use of the valve with low pressure hydraulics as well as with air.

It is a further object of the present invention to provide a new improved solenoid pilot valve unit incorporating an exhaust path which passes through the solenoid casing to the exhaust manifold of the main valve body.

It is another object of the present invention to provide a novel pilot valve assembly using a novel arrangement of O-rings and cylinder inserts for an effective low cost construction.

It is a further and related object to provide a pilot valve operating pin and solenoid operating means therefor incorporating an emergency pull-out mechanism in event the valve operating pin should stick during operation.

It is still a further object of the present invention to provide a novel valve unit in which the sealing gaskets for the valve components are used in a novel way to provide fluid passages therebetween, thereby eliminating the necessity of machining or casting corresponding passages in said valve components.

It is another object of the present invention to provide for a fluid valve a solenoid pilot valve unit having an inclined solenoid casing which permits insertion of wires at one end and easy hand operation of the valve at the other end in the event of an emergency.

It is still another object of the present invention to provide a valve including a novel enclosed solenoid pilot valve unit in which the casing has a novel O-ring seal, so that atmospheric moisture is sealed out, the operating fluid is sealed in and the valve can be operated when submerged in a fluid if necessary.

It is still another object of the present invention to provide a solenoid operated pilot valve unit having a two-part casing with a captive screw arrangement so that the retaining screws are not lost when the casing is disassembled for inspection or repairs of the solenoid or emergency manual operation of the pilot valve.

It is still another object of the present invention to provide in a valve having a variable exhaust and a flow control spindle that is fluid-operated in both directions, a bleed passage which prevents air being trapped at line pressure in the cylinder of said control spindle when the variable exhaust of the valve is closed.

It is still another object of the present invention to provide a solenoid-operated pilot valve unit having a novel double O-ring retaining connection between the solenoid plunger and the operating means for the pilot valve, thereby preventing shear of the retaining rings due to solenoid vibration, for long-life and trouble-free operation.

It is still another object of the present invention to provide a novel valve which achieves the foregoing advantages and is readily convertible from single solenoid action to double solenoid action, and vice versa.

It is another object of the present invention to provide a novel solenoid-operated three way valve which embodies a metering valve incorporating the aforementioned advantages of the present invention and a bleed arrangement which eliminates interference with pilot valve operation encountered in the use of throttled-exhaust three way valves heretofore available.

It is till another object of the present invention to provide a novel fluid valve which incorporates the aforementioned objective and advantages of this invention and includes means adapting the valve for removal and replacement without breaking line pipe connections.

It is a related object of the present invention to provide a novel control valve arrangement which incorporates an adapter unit installed in the line so that the control valve unit itself can be removed for repair and another valve substituted in its place in the interim, whereby the machine or hydraulic system need not be taken out of use for any appreciable time for valve inspection or repairs.

These and other objects and advantages of the invention will be apparent to those conversant with the art from a reading of the following description and appended claims in conjunction with the annexed drawings in which:

FIGURE 6 is a fragmentary sectional view looking along line 6—6 in FIGURE 2;

Figure 1:
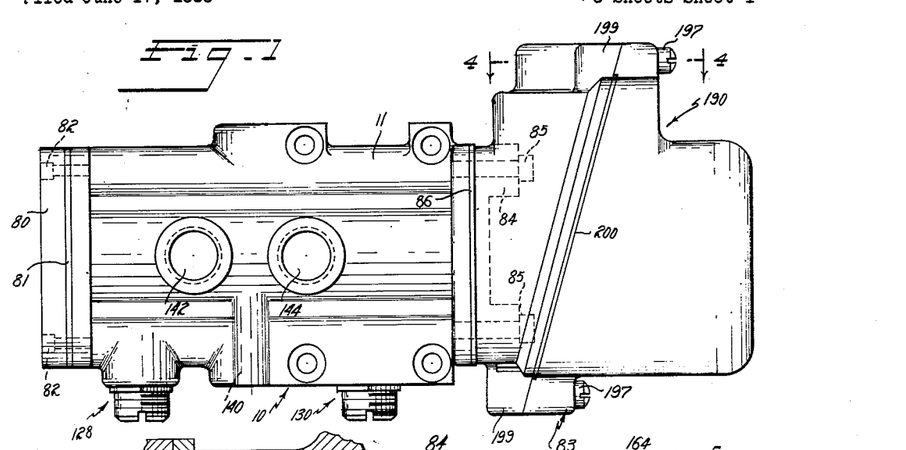
FIGURE 1 is an elevational view of one embodiment of the valve of this invention.
Figure 2:
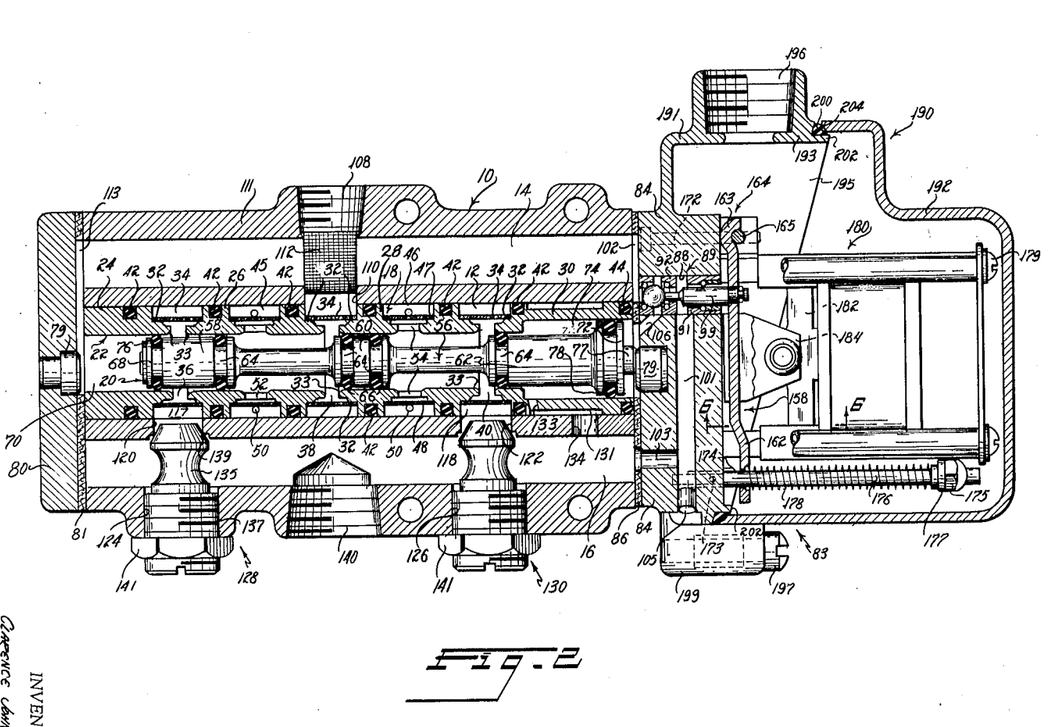
FIGURE 2 is a longitudinal sectional view of the valve shown in FIGURE 1.

Referring to the drawings and particularly FIGURES 1 and 2, reference numeral 10 indicates generally a valve including a valve body or housing 11 usually of cast construction, containing a centrally located bore 12. The housing 10 also contains an inlet chamber or manifold 14 and an exhaust chamber or manifold 16 which may take the form of coplanar bores flanking and parallel to the main bore 12. Suitable support feet are preferably provided to support the valve body where it is to receive external support.

The main or flow control valve indicated generally at 18 (FIGURE 2) is comprised of a control element 20, axially slidably disposed in a segmented guide bore indicated generally at 22. The guide bore 22 is defined by a number of substantially cylindrical liner elements 24, 26, 28, and 30, coaxially arranged in main bore 12. The ends of the liner elements are of reduced diameter to form annular extensions 32, adjacent extensions being received in and spaced by cylindrical spacer screens 34 of multi-foraminous construction to define annular free flow ports 36, 38 and 40 between respective adjacent liners. The extensions 32 are formed with radii 33 adjacent ports 36, 38 and 40 to permit O-rings 66 to pass smoothly thereover as will be seen from the operation of the device to be later described. The liner elements 24, 26, 28 and 30 are a free fit in bore 12 and are externally grooved to accommodate suitable packing such as O-rings 42 and 44. The O-rings 42 and 44 eliminate the need for close tolerance fits between the liner elements and the bore 12, allow a certain degree of resilience in the positioning of the individual liner elements to compensate for slight misalignment, and provide an effective seal against the leakage of operating fluids between the liners and the bore 12. O-ring 44 has the additional functions of sealing the right hand end of bore 12 and permitting greater latitude in respect to the necessary tolerances to which the lengths of the liner elements must be held.

Intermediate liner elements 26 and 28 are identical and interchangeable, and are formed with annular grooves 45 and 46 providing shoulders 47 accommodating screen cylinders 48 held in position by means of retainer rings 50. A plurality of radial ports 52 place the interior of liner element 26 in communication with groove 45. Similarly, a plurality of radial ports 54 place the interior of liner element 28 in communication with groove 46.

Control piston or spool 20 consists of an elongated stem 56 formed with axially spaced lands 58, 60 and 62 freely received within guide bore 22 for selective sealing off and control of ports 36, 38 and 40, respectively. The transition sections of control element 20 between stem 56 and each of the lands 58, 60 and 62, as clearly shown in FIGURE 2, is filleted and cooperates with the curved ends 33 of extensions 32 and the similarly rounded inner corner of ports 52 and 54, a smooth fluid flow path for the operating fluid reducing to a minimum sharp corners producing eddy currents interfering with optimum fluid flow. Annular grooves 64 on each land are provided with free-floating O-rings 66 (relieved about .015) which serve to seal the respective ports when straddled by the lands. As will be noted from FIGURE 2, substantial clearance remains between the lands of piston 20 and the guide bore 22 so that port sealing is effected by the O-rings 66 rather than the associated lands which do not contact the bore 22 and function principally to maintain the proper spacing between the O-rings.

The outer diameter of each O-ring 66 is greater (preferably by 5 to 8%) than the diameter of the guide bore 22, and the width and depth of the grooves 64 are approximately 10% greater than the cross sectional diameter of the O-ring. As a result, fluid pressure P enters the clearance space on the high pressure side of the O-ring forcing the O-ring laterally against the opposite side of the groove and radially outwardly against the guide bore so that an effective seal is achieved between the annular contact surfaces of the guide bore and the low pressure side of the groove. The O-rings 66 at the inner ends of lands 58 and 62 are preferably formed of 90° durometer hardness to prevent blowing due to the high differential pressure across them in normal passage over annular ports 36 and 40 while the remaining O-rings 66 are preferably of 80 durometer hardness. The construction and mode of operation of the combination seal and floating spool support provided by O-rings 66 is fully explained in the above-identified parent Patent 2,912,007.

The end 68 of control spool 20 adjacent land 58 functions as a piston 68 and will hereinafter be referred to as such. Piston 68 operates in a cylindrical chamber 70 defined by liner 24. At the opposite end from piston 68, control spool 20 is formed with a piston 72 of slightly greater diameter than piston 68 operating in a cylindrical chamber 74 defined by liner element 30.

Pistons 68 and 72 are provided with O-rings 76 and 78, respectively, adjacent the extreme ends of control spool 20. O-rings 76 and 78 have a squeeze fit in the respective chambers 70 and 74 so as to support spool 20 at its opposite ends. A squeeze of .005 inch has been found satisfactory for most applications but a somewhat tighter or looser fit may be used. Thus, the control spool 20 is supported entirely by the end O-rings 76 and 78 allowing free floating movement of control element 20 in bore 22. Such an arrangement affords maximum service life to the intermediate O-rings 66. To differentiate between O-rings 66 on the one hand and O-rings 76 and 78 on the other, the former may be considered as sealing rings while the latter are supporting or bearing rings as well as seals. The use of O-rings as above described also compensates for misalignment eccentricities and eliminates the necessity of close fits and manufacturing tolerances.

The piston faces at the extreme ends of control element 20 are provided with hardened steel inserts 77 adapted to abut similar inserts or buttons 79 on the end closures of the housing to reduce wear caused by the repeated contact between said ends and the end closures.

A cover plate 80 fastened to the left hand end of the housing 10 as by screws 82 forms one end closure and closes the adjacent ends of bore 12 and chambers 14 and 16, with a suitable gasket 81 being provided between the mating surfaces. A combination solenoid and pilot valve assembly unit with a housing generally indicated at 83 forms the other end closure and includes a mounting base or plate 84 fastened to the opposite end of the housing 20 as by cap screws 85 (FIGURES 1 and 2), with a suitable gasket 86 being provided between the mating surfaces.

Figure 3:
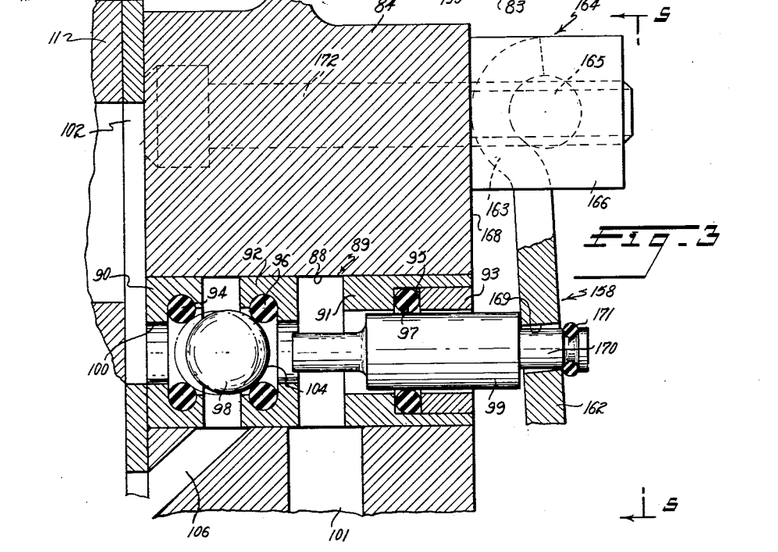
FIGURE 3 is a fragmentary enlargement of a portion of FIGURE 2 showing details of the novel pilot valve arrangement in the valve unit of the present invention.

As best shown in FIGURES 2 and 3 mounting plate 84 forms the base of a solenoid assembly and pilot valve unit 83 of general valve utility. Plate 84 is apertured as at 88 to receive, with a press fit, a pilot valve control or contactor assembly generally indicated at 89 as may be desired. As illustrated a pair of spaced, oppositely disposed annular inserts 90, 92 are press fitted into one end of aperture 88. The opposing end surfaces of the inserts are annularly recessed to accommodate and retain resilient seating rings, such as O-rings 94 and 96 which are of 90 durometer hardness. A spherical pilot valve 98, preferably a stainless steel ball, is disposed for double-acting operation between seat rings 94 and 96, the dotted and solid line positions shown in FIGURE 3 being the two extreme positions.

An axially recessed machined ferrule 91 is press- fitted in the other end of bore 88 and an annular insert 93 is in turn press fitted into the recess of ferrule 91 to form an annular groove 95. Groove 95 receives an O-ring 97, preferably of 90 durometer hardness, and a reciprocating pin 99 is supported by ring 97 for operating pilot valve 89 under action of the solenoid of unit 83 as hereinafter described. The outer diameter of O-ring 97 is slightly greater than the diameter of the recess in ferrule 91, and its inner diameter is slightly smaller than the diameter of pin 99 so that an efficient seal is effected against escape of air or hydraulic fluid from pilot valve 89 past pin 99. The space between inserts 90 and 92 is in communication with cylinder chamber 74 of valve body 10 through a passageway 106 in base plate 84, and a suitable opening in gasket 86 as shown in FIGURE 2. Base plate 84 is also provided with a pair of intersecting passages 101 and 103, the inner end of passage 101 terminating at bore 88 between insert 92 and ferrule 91 so that the space therebetween is in communication with exhaust manifold chamber 16 of valve body 10 through a further suitable opening in gasket 86. A small plug 105 is press-fitted in the outer end of passage 101 to close it off, as shown in FIGURE 2. Gasket 86 is also provided with an enlarged opening 102 surrounding the adjacent end of inlet manifold chamber 14 and port 100 (FIGURE 3) defined by insert 90 so that the pilot valve 89 is in communication with inlet chamber 14. Use of gasket 86 in this manner is a substantial improvement over the corresponding construction shown in parent Patent 2,912,007 since it provides the necessary communication between inlet chamber 14 and pilot valve 89 without machining of a passageway in valve body 10 or base plate 84 thereby simplifying production and lowering costs.

The above-described sealed arrangement for the pilot valve operating pin and the provision of exhaust passages 101 and 103 in base plate 84 to exhaust manifold 16 permits valve 10 to be used interchangeably in relatively low pressure hydraulic systems as well as with air. The present invention thus affords a substantial improvement over the valve construction of the prior application in which the pilot valve exhaust bleeds to atmosphere thereby limiting use of the valve to air systems only.

Referring again to FIGURE 2, housing 10 is provided with an inlet port 108 that communicates with chamber 14 and is adapted to be connected to a source of fluid under pressure. Although port 108 may be located at any point on the housing so long as it opens into chamber 14, it is preferably located substantially midway between the ends of chamber 14, directly opposite and in coaxial alignment with a port 110 connecting chamber 14 with the interior of bore 22 through annular port 38. In order to exclude foreign particles from chamber 14, a screen cylinder 112 is provided between ports 108 and 110. The fluid entering port 38 must, therefore, pass axially through screen 34.

Gasket 81 is provided with an oversize opening 113 the periphery of which extends around the end of chamber 14 and spool guide bore 12 so that inlet chamber 14 is in direct communication with cylinder chamber 70.

The adjacent ends of liner elements 24 and 26, with their respective reduced extensions 32 define an annular groove 117. A similar groove 118 is defined between liner elements 28 and 30. Ports 120 and 122 are provided in the wall of exhaust manifold 16 in alignment with and intersecting grooves 117 and 118, respectively. The wall of the manifold 16 opposite ports 120 and 122 are provided respectively with threaded openings 124 and 126 in coaxial alignment with ports 120 and 122 for the installation of flow control or metering valves 128 and 130, where desired.

Two flow control valves have been shown in this exemplary embodiment of the invention but it will be understood that only one metering valve may be used where only unidirectional control of the rate of speed of the associated servo-motor is desired or the flow control valves may be omitted entirely if a constant speed operation of the servo-motor in both directions is satisfactory for the particular installation.

The metering valve 128 comprises a plug 135 having a threaded portion 137 threadedly engaged in aperture 124 and a tapered end 139 extending into port 120. The tapered end 139 and port 120 coact to define an annular orifice the area of which may be varied by threading plug 130 in and out in aperture 124. A lock nut 141 is provided to hold plug 135 at any particular metering setting thereby preventing displacement by accident, vibration or the like. Metering valve 130 is of like construction as valve 128 and controls the area of the annular exhaust orifice in port 122 in like manner. While the type of metering valve disclosed is preferable, other arrangements may be used, such as those disclosed in FIGURE 2 of parent Patent 2,912,007.

Liner element 30 between its ring grooves is reduced in diameter to provide an annular, external chamber 131 connected by a bore 133 to cylindrical chamber 74. A bleed port 134 is provided in the wall of chamber 16 to interconnect port 131 with the exhaust chamber 16. Thus 133—131—134 form a bleed passage between piston chamber 74 and exhaust that prevents air or hydraulic fluid at line pressure from being trapped in chamber 74 in passage of spool 20 across annular port 40 when metering valve screw 130 is in a metering position in port 122. This assures valve 10 against sticking because of equal end pressures on spool 20 when the spool 20 is to be operated in the opposite direction.

A threaded exhaust port 140 communicates the interior of manifold 16 with the atmosphere either directly, or through a conduit (not shown) which is threadedly secured to the port.

As shown in FIGURE 1, the valve body 11 contains a pair of threaded outlet ports 142 and 144 that have axes substantially perpendicular to the axis of bore 108 and communicate with grooves 45 and 46 respectively. Ports 142 and 144 are adapted to be connected by conduit means not shown to a servo-motor or like device in conventional manner as diagrammatically illustrated in FIGURE 1 of the above-mentioned parent Patent 2,912,007.

Referring to FIGURES 2 and 3, the pilot valve 98 is actuated in one direction, i.e., pushed from seat 96 to seat 94 by means of pin 99 operated by a novel, hinged operating lever assembly indicated generally at 158. The lever assembly 158 comprises a lever 162 provided with an arcuate section 163 at one end forming part of a hinge connection 164. Hinge connection 164 further comprises a pin 165 extending between two block supports 166 each of which has a threaded hold 167 receiving a respective machine screw 172 by which each block is mounted on base plate 84. Blocks 166 and shaft 165 are preferably formed as an integral unit by die casting, or is otherwise produced so that the three parts are in effect integral. Arcuate section 163 is disposed between pin 165 and surface 168 of base block 84 as shown in FIGURES 2 and 3 so that lever 162 pivots freely about pin 165. The above-described construction provides a simplified easy-to-produce low cost improved hinge and lever arrangement for actuation of pilot valve operating pin 99 as hereinafter described.

In order to insure that screws 172 cannot possibly work loose under high frequency operating conditions, they are inserted from the abutment surface of the plate 84 and the head is countersunk flush with said surface. The elements of the hinge arrangement 164 are assembled on plate 84 before it is secured to the valve body 11 and when the plate is in position on the housing the heads of screws 172 abut the adjacent portion of the housing through gasket 86. Thus, since rotation of integral parts 165, 166 is precluded by their double mounting, and screws 172 cannot "back off" because their heads abut the valve body 11, no amount of vibration will materially loosen the screws 172 or hinge 164.

Lever 162 is provided with an oversize aperture 169 (FIGURE 3) that receives a reduced extension 170 of pin 99, which is provided at its outer end with a retaining O-ring 171. Thus, as is apparent from FIGURES 2 and 3, when hinged lever 162 swings around its pivot it bears either against the shoulder of the enlarged section of pin 99 or against O-ring 171. It will be appreciated that the fluid pressure in manifold chamber 14 is at all times effective on ball 98 so that pin 99 is urged at all times in a direction to move lever 162 counterclockwise around its pivot. As a consequence, O-ring 171 normally has little mechanical stress on it and reciprocation of operating pin 99 in large O-ring 97 to control the position of ball 98 and govern operation of pilot valve 89 is normally effected in one direction by the solenoid spring overcoming the fluid pressure and in the opposite direction by the solenoid pulling lever 162 against little O-ring 171 to overcome the slight spring force in excess of the fluid pressure required to press pin 99 inwardly to unseat ball 98. In event pin 99 sticks in main O-ring 97 and release of ball valve 98 is not effected, the continued pull of the solenoid unaided by effective fluid pressure will disassociate ring 171 from pin 99 permitting the solenoid to complete its cycle without danger of burning out. As soon as the solenoid shuts off and the valve fails to function the solenoid cover can be removed to permit freeing of pin 99.

Referring again to FIGURE 2, the free end of lever arm 162 is apertured as at 174 to freely receive the shank of a pin 176 press-fitted at one end into plate 84. Preferably a small tapered locking pin 173 is provided extending through mating drilled holes in base 84 and the end of pin 176 to assure that the pin will not turn, as occasionally happens when such locking pin is not provided. A coil spring 178 (the solenoid spring just referred to) is compressed between strip 162 and an adjustable lock nut 175 and washer 177 at the free end of pin 176 to resiliently bias lever 162 toward the plate 84 so that pin 99 forces ball 98 into seat 94 against the opposing force of the fluid pressure. The force of spring 178 is adjustable by means of nut 175 to secure a light overbalance of the spring force so as to assure proper operation of O-ring 171.

The position of lever arm 162 is controlled, in this embodiment by the single solenoid indicated schematically at 180 and mounted on plate 84 through screws 179. Solenoid 180 has a plunger 182 which moves away from plate 84, when the solenoid armature is electrically energized. The solenoid plunger is kinematically linked to the lever 162 by means of a free floating U-shaped stirrup 184 (see FIGURE 6). A pin 186 extending through the stirrup and plunger pivotally connects the two and is retained in position by a pair of O-rings 188 and 189 located at the opposite ends of the pin. Smaller O-rings 188 are received in annular grooves at the ends of pins 186 to function as retaining rings and a larger O-ring 189 is interposed between each of the small O-rings and the adjacent sides of the metal stirrup 184. This double O-ring construction prevents the metal parts from shear cutting O-rings 188, a situation that would arise if O-rings 188 alone were employed.

To protect the solenoid, pilot valve and lever assemblies from damage from external sources, they are completely enclosed by a novel casing 190 which comprises two sections 191 and 192. Section 191 includes base 84, a deep sidewall 193 provided with an annular apertured boss 196 to pass wiring to solenoid 180 and an opposed shallow side wall 194 connected to wall 193 by sloping side walls 195. Section 192 comprises cup shaped element having a base wall and deep, shallow and sloped connecting side walls arranged for mating cooperation with the walls of section 191 to which it is detachably secured by screw fasteners 197. Fasteners 197 are freely but captively received in threaded bores 198 of section 192 and are adapted to thread into a pair of mounting bosses 199 on section 191.

Figure 4:
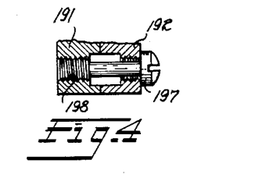
FIGURE 4 is a fragmentary sectional view taken on line 4—4 of FIGURE 1.
Figure 5:
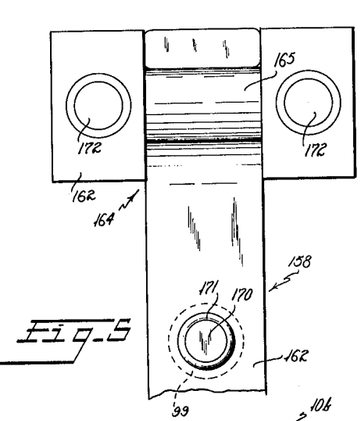
FIGURE 5 is a fragmentary view looking in the direction of arrows 5—5 in FIGURE 2.

Referring particularly to FIGURE 4 it will be seen that screws 197 are provided with a reduced section between the head and threaded end so that the screw is captive and cannot be lost when withdrawn from bore 188 to remove casing section 192 for inspection, adjustment or the like. The above-described novel inclined wall construction of casing 190 through fitting 196 permits solenoid leads to be permanently inserted through the deep wall of section 191 while permitting removal of section 172 for inspection and repair of the elements housed by casing 190 and easy manipulation of lever 162 for hand operation of pilot valve 89, whenever necessary, as in an emergency or for adjustment, or set-up purposes.

A large O-ring 200, preferably of 70 durometer hardness is assembled in encircling relation to a peripheral lip 202 on section 191 so that casing 190 is sealed when section 192 is secured to section 191 by screws 197 and the boss 196 for the solenoid wiring is suitably threadedly engaged with the customary armored cable. Section 192 is provided with a small radius 204 extending around its periphery to retain the sealing ring 200 against inadvertent displacement. The above-described O-ring sealing means 200, 202, 204 seals the solenoid casing 190 against atmospheric moisture and valve 10 can be operated even though immersed in a fluid. It also minimizes fire hazard or damage to the solenoid by preventing machine and cutting oils from inadvertently getting on the solenoid parts.

The ratio of travel of the solenoid plunger 182 to the travel of the pilot ball valve, in the disclosed embodiment is approximately 3 to 1. Since the valve travel is between $\frac{1}{16}$ and $\frac{1}{32}$ inch, the maximum required stroke of the solenoid should be capable of a slightly longer proportional stroke to cope with normal manufacturing tolerances, etc. At any rate, this is very light service for the usual industrial solenoid and conducive to long life. Further, in this regard, it will be appreciated that a solenoid sufficiently powerful to actuate the control element 20 directly would draw 13 to 15 times more current (amperage) than that disclosed herein to operate the pilot valve.

The operation of this first embodiment of the invention is as follows:

Operating fluid under suitable pressure enters manifold 14 from inlet port 108. With the solenoid de-energized spring 178, acts through lever 162 and pin 99 to force pilot ball valve 98 against seat 94 closing port 100. The pressure fluid in manifold 14, in this position of pilot ball valve 98, passes through recess 113 of gasket 81 to chamber 70 forcing and holding valve control spool 20 to the right limit position shown in FIGURE 2. Any air or pressure fluid in chamber 74 is expelled by piston 72 through slot 106 and the port 104 (FIGURE 3) to exhaust manifold 16 through passages 101 and 103, and then to the atmosphere or a fluid reservoir through outlet 140. Any air or pressure fluid trapped behind piston 72 will be bled to manifold 16 through ports 133 and 134 as will be clear to one skilled in the art.

With the control element in such position, fluid in manifold 14 also flows through port 38 into the space defined by lands 58 and 60, and through ports in liner element 26 to groove 45 and thence through port 142 to a conduit connected to a servo-motor, as illustrated in FIGURE 1 of my parent Patent 2,912,007. Meanwhile, the fluid in what is now the exhaust side of the servo-motor is expelled through a conduit connecting it with port 144, and thence through ports 54, the space between lands 60 and 62, port 40, groove 118, and through metering port 122 of needle valve 130 into the exhaust manifold 16 and out of port 140 to the atmosphere or fluid reservoir. Adjustment of the metering valve 130 controls the rate at which fluid can escape from the present exhaust side of the servo-motor and therefore regulates the speed of the servo-motor piston in one direction.

When the solenoid 180 is energized, the plunger 182 moves lever 162 to the right overcoming the overbalancing force of spring 178 and removing pin 99 from its contact with ball 98. The fluid pressure in manifold 14, acting through passage 102 and port 100 forces ball 98 to the right against seat 96, closing the pilot valve exhaust port 104 and allowing the fluid under pressure to pass through passages 106 to chamber 74. At this time, fluid under equal pressure is acting in opposite directions on pistons 68 and 72 but, due to the greater area of the piston 72, and the bleed path from the space behind piston 72, the control element 20 is shuttled to the left. In that position, the operating fluid in chamber 14, passes through port 38, between lands 60 and 62, through ports 54, groove 46, port 144 and a conduit connecting it to the other side of the servo-motor (not shown) forcing the servo-motor piston in the other direction and expelling air from the other end of its cylinder through a conduit connected to port 142, and thence through groove 45, ports 52, between lands 58 and 60, through port 36, groove 117, port 120 and meter valve 128 to the exhaust manifold 16 and through exhaust port 140 to the atmosphere. The rate of speed of the servo-motor in the opposite direction is determined by adjustment of valve 128. Thus the speed of the servo-motor in either direction is independently controlled by valves 128 and 130, respectively.

In this, as well as all other solenoid operated embodiments hereinafter disclosed, in the event of a power failure, cover section 191 may be removed for manual operation of the lever assembly 158.

The above-described valve embodiment can be easily modified from a single solenoid differential piston operation to use of two solenoid operated pilot valves, according to the modification disclosed in my parent Patent 2,912,007 in connection with FIGURE 5 thereof, merely by assembling a gasket 86 and a base 84 with its casing 190 and associated parts on the left end of valve body 11.

Figure 7:
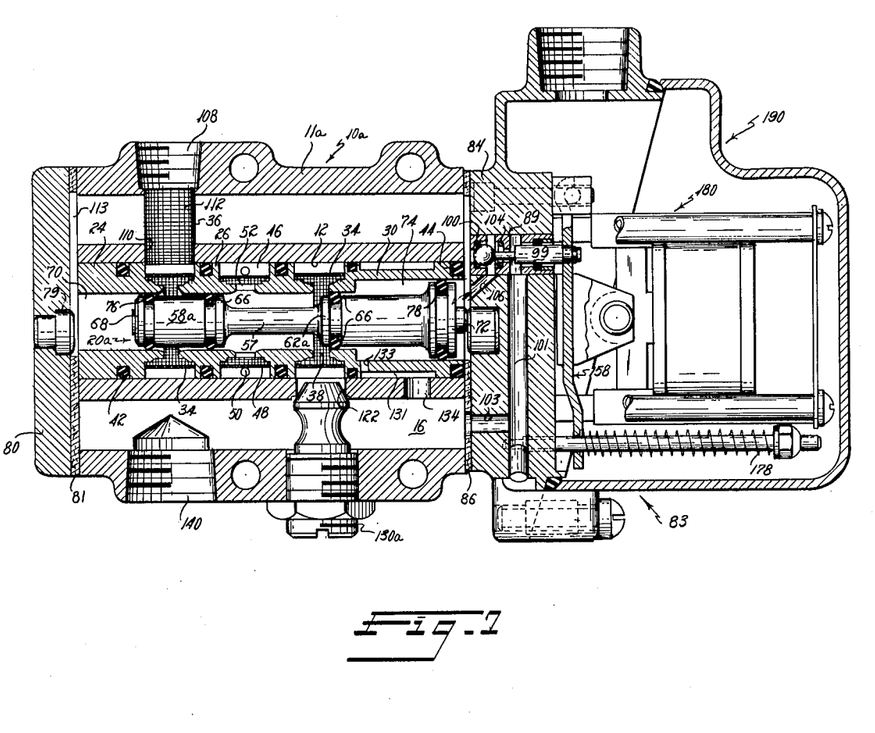
FIGURE 7 is a longitudinal sectional view similar to FIGURE 2 showing a modification of the present invention in a three way valve.
Figure 8:
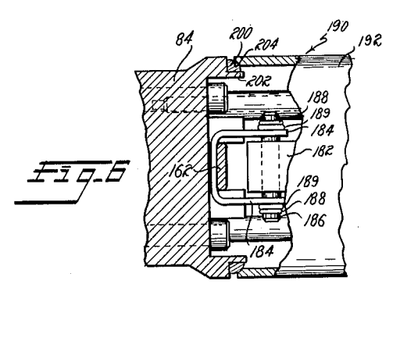
FIGURE 8 is a plan view, partly in section, of the main valve body section of the three way valve unit shown in FIGURE 7.

In FIGURES 7 and 8, there is shown a modified form of the invention in a three way valve. In describing this embodiment, elements in common with the four way valve of FIGURES 1–6 will be designated by like numerals, and corresponding modified structure will be designated insofar as possible by like reference numerals with a subscript $a$.

As will be apparent from the drawings, the three way valve 10a is the same as the above-described four way valve 10 excepting that valve body 11a, and spool 20a and its cylinder liner arrangement are modified for three way operation. A three way valve may be used for unidirectional hydraulic operation of a servo-motor. Valve 10a, therefore, has only conduit port 144a. There are only three liner sleeves 24, 26 and 30 in valve 10, but excepting for omission of a fourth liner, the cylinder liner construction in the modification of FIGURES 7–8 is otherwise the same as in FIGURES 1–6. Spool 20a is provided with O-rings 66 of 90 durometer hardness and O-rings 76 and 78, and has piston sections 68 and 72 at either end, in like manner as in the four way valve of FIGURES 1–2. The control spool 20a differs from spool 20 in FIGURES 1–6 by omission of the central land 60 so that the end land sections 58a and 62a are connected by a single stem 57 of reduced diameter. The three way valve of FIGURES 7–8 also differs from the four way valve of FIGURES 1–6 in having only one exhaust meter screw 130a. Otherwise, the construction of three way valve 10a is substantially the same as that of four way valve 10, and such construction will be readily apparent from the foregoing description together with the following discussion of mode of operation of valve 10a in FIGURES 7 and 8, which is as follows:

Operating fluid under pressure enters manifolds 14 from inlet port 108. With the solenoid unit 83 de-energized, spring 178 acts through lever 162 and pin 99 to seat pilot valve 89 so as to close port 100 and open port 104 as heretofore described. As a consequence, there is no supply inlet hydraulic fluid acting on the right end of the control spool 20a. Pressure fluid acting on piston 68 will, therefore, hold spool 20a to the right limit position shown in FIGURE 7. Any air in chamber 74 is expelled by the piston 72 through slot 106 and passages 101, 103 to exhaust manifold 16 or bled through passages 133 and 134 to manifold 16, and thence to the atmosphere through outlet 140 as previously described.

With the control spool 20a in such position, fluid also passes through port 36 from pressure inlet 108 but is blocked from further travel by the sealing O-rings 76 and 66 on land 58a, as will be apparent from FIGURE 7. Meanwhile, exhaust fluid passes into the valve body 10a from the servo-motor (or like means controlled by the valve unit 10a) through port 144a, thence through groove 46 in liner 26, passage 52, port 38, port 122 of meter valve 130a, exhaust manifold 16, and then to atmosphere through exhaust port 140. In this way, the return stroke of the valve operated servo-motor is throttled through the valve unit 10a. Adjustment of meter valve 130a controls the rate at which fluid can be exhausted from the servo-motor and therefore regulates its speed on the return stroke.

When solenoid 83 is energized, pilot valve 89 operates to apply fluid to piston 72 moving it to the leftward position in FIGURE 7 in the same way as in the embodiment of FIGURES 1–6. In this position of the control spindle 20a, pressure fluid from inlet 108 passes through bore 110 and port 36, which is now disposed between lands 58a and 62a and O-rings 66. It then passes out ports 52 to port 144a, and the conduit connected thereto, to supply fluid under pressure to the servo-motor for its power stroke.

In prior three way valve units and installations without a metering screw and exhaust arrangement as disclosed herein, the use of a throttled exhaust interfered with pilot valve operation and was unsatisfactory because of trapped fluid in chamber 74. However, with the novel arrangement of exhaust metering screw and exhaust manifold passage and bleed ports in the above-described three way pilot valve combination that problem and shortcoming of prior devices is very effectively avoided.

In FIGURES 9–12 there is shown another modification of the above-described valve of FIGURES 1–6 incorporating means adapting the valve for removal and replacement without breaking the line connections. Again in describing this modification, elements common to the embodiment of FIGURES 1–6 will be designated by like numerals, and corresponding modified structure will be designated insofar as possible by like numerals with a subscript b.

Referring to FIGURES 9–12, the adapter valve unit according to this modification is indicated generally at 210 and comprises a valve unit 10b and a line adapter 212. The valve unit generally indicated at 10b is the same in all respects as the above-described valve unit 10 of FIGURES 1–6, excepting that the valve body 11b is provided with a different arrangement of inlet, exhaust, and conduit discharge ports to adapt it for use in the novel combination 210 including the adapter unit 212, as hereinafter described. In view of this, the valve working parts are omitted from FIGURES 9–12 to permit greater clarity in showing the modified valve body 11b and cooperating adapter 212.

Figure 9:
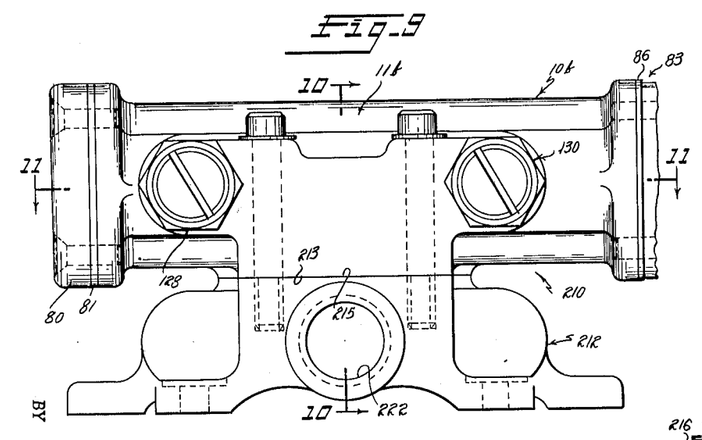
FIGURE 9 is a side elevation view of a modification of the present invention which includes an adapter that is permanently installed in the line so that the valve may be removed and replaced without breaking line connections.
Figure 10:
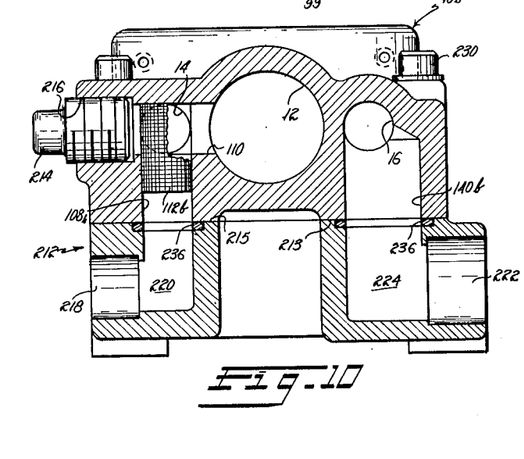
FIGURE 10 is a sectional view taken along line 10—10 in FIGURE 9.
Figure 11:
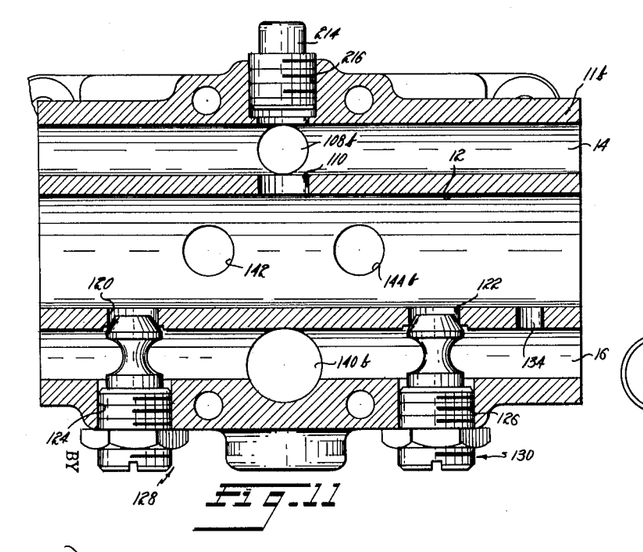
FIGURE 11 is a partial longitudinal sectional view taken along lines 11—11 in FIGURE 9, with valve working parts being omitted to show the valve body construction more clearly.
Figure 12:
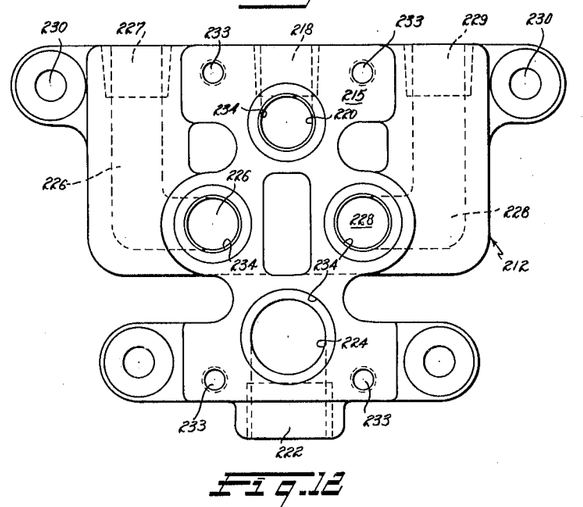
FIGURE 12 is a top plan view of the adapter section of the valve modification disclosed in FIGURES 9 to 11.

One side of the valve body 11b is provided with a seating surface 213 which mates with a similar seating surface 215 on the adapter 212 when they are in assembled relation as shown in FIGURES 9 and 10. An inlet bore 108b extends from surface 213 to communicate with inlet chamber 14 which in turn through bore 110 communicates with chamber 12. Chamber 12 has the same relationship and function with respect to the central valve spool and its cylinder liners as bore 110 in the modification shown in FIGURE 2. A threaded plug 214 (FIGURE 10) is provided to seal off bore 216, which is made in body 11b in order to machine bore 110. A screen 112b is provided in inlet port 108b and chamber 14 for the same purpose as screen 112 in the embodiment of FIGURES 1–6. An exhaust port 140b extends from the surface 213 to communicate with exhaust manifold 16. A pair of bores 142b and 144b also extend from surface 213 to communicate with bore 12, and each has the same relationship with respect to the central valve spool and its cylinder liners (not shown) as ports 142 and 144, respectively, in the modification of FIGURES 1–6.

Adapter unit 212 is provided with an inlet port 218, and an intersecting bore 220 extending from the surface 215 to form a passageway communicating with inlet port 108b of the valve unit 10b. It is also provided with an exhaust port 222 and a bore 224 similarly communicating with exhaust port 140b of the valve unit 10b. A first outlet passageway 226 extends from the mounting surface 215 to the outlet port 227, and a second similar outlet passageway 228 extends to outlet port 229. The adapter 212 is mounted on the machine or like supporting means in the system in which it is used by bolts passed through mounting holes 230. It is permanently installed in the line to the servo-motor (or like control devices) by connecting the inlet pressure conduit to port 218, and connecting the outlet conduits leading to the servo-motor to ports 227 and 228. The complete solenoid operated pilot valve unit 10b is then secured as a unit to the adapter unit 212 by four bolts 232 secured at their threaded ends in threaded bores 233 in adapter 212. Bores 220, 224, 226 and 228 are counterbored adjacent surface 215 of adapter 212 at 234, and an O-ring 236 is provided in each counterbore 234 to seal the passageway against leakage when valve 10b is assembled on adapter 212, as will be apparent from FIGURE 10.

The operation of this embodiment is substantially the same as the embodiment of FIGURES 1–6 excepting that air or hydraulic fluid passing through ports 108b, 140b, 142b and 144b in valve 10b (which correspond to ports 108, 140, 142 and 144 respectively, in FIGURES 1–6) also passes through cooperating passageways in the adapter 212 in a manner that is apparent from the foregoing discussion of this modification and the drawings. This modification of the present invention makes it possible to remove the valve 10b as a unit for inspection and/or repair without breaking any line connections, and further makes its possible to readily and quickly install a substitute valve unit 10b in a few minutes so that the machine or system may continue to function while the valve is being repaired. Loss of time in the machine or system due to valve inspection or repair is thereby kept at a minimum.

It will be apparent that the threeway valve of FIGURES 7–8 can also be modified in like manner as the four-way valve of FIGURES 1–6 to provide a three-way valve and adapter combination similar to the above-described modification of FIGURES 9–12.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed and desired to be secured by United States Letters Patent is:

1. A control valve assembly for use in controlling the flow of actuating fluid in a servo-motor system or the like comprising a valve body having a pressure fluid inlet chamber, a pressure fluid exhaust chamber, a main bore, an inlet connecting said inlet chamber and said main bore, a plurality of exhaust ports spaced from one another and said inlet port along the length of said main bore connecting said exhaust chamber and said main bore, a plurality of combined outlet and return ports intersecting said main bore and each disposed along said main bore in respective cooperative relation to said inlet port and a respective exhaust port; an axially slidable control element having axially spaced valving lands between its ends slidingly and sealingly engaging the wall of said main bore and also having piston sections of different effective pressure areas at each end slidingly and sealingly engaging the wall of said main bore, said control element between said valving lands providing axially extending, annular fluid passages adapted to respectively alternately connect said respective combined outlet and return ports alternately to said inlet port and its respective exhaust port; respective passage means connecting each of said piston pressure areas to said inlet pressure chamber, said means for connecting the larger pressure area to the inlet pressure chamber including pilot valve means comprising a two way check valve means for alternately connecting said larger pressure area to said inlet chamber or to said exhaust chamber and means for operating said check valve to selectively apply said actuating fluid to said larger pressure area to position said control element, normally maintained in a position to cut off the supply of actuating fluid to said larger pressure area and vent said larger pressure area to said exhaust chamber under influence of said actuating fluid applied to said smaller pressure area, in a position to supply pressure fluid to one side of said servo motor system to and maintaining said servo motor system and exhaust pressure fluid from the other side of said servo motor system thereby effecting operative movement of said servo motor system from its normally maintained position of rest.

2. The valve combination of claim 1 together with passage means venting the valve body immediately anterior of said larger piston section to said exhaust chamber thereby obviating the possibility of a fluid lock interfering with proper operation of said control element.

3. A control valve assembly for use in controlling the flow of actuating fluid in a servo-motor system or the like comprising a valve body having a pressure fluid inlet chamber, a pressure fluid exhaust chamber, a main bore, an inlet port connecting said inlet chamber and said main bore, a plurality of exhaust ports spaced from one another and said inlet port along the length of said main bore connecting said exhaust chamber and said main bore, a plurality of combined outlet and return ports intersecting said main bore and each disposed along said main bore in respective cooperative relation to said inlet port and a respective exhaust port; an axially slidable control element having axially spaced valving lands between its ends slidingly and sealingly engaging the wall of said main bore and also having piston sections of different effective pressure areas at each end slidingly and sealingly engaging the wall of said main bore, said control element between said valving lands providing axially extending, annular fluid passages adapted to respectively alternately connect said respective combined outlet and return ports alternately to said inlet port and its respective exhaust port; respective passage means connecting each of said piston pressure areas to said inlet pressure chamber, said means for connecting the larger pressure area to the inlet pressure chamber including pilot valve means comprising a solenoid operated pilot valve unit comprising a two way check valve means for alternately connecting said larger pressure area to said inlet chamber or to said exhaust chamber, a solenoid, and means responsive to actuation of said solenoid for operating said check valve to alternately connect said larger pressure area to said inlet chamber or to said exhaust chamber and establish two operating positions only for said control valve.

4. A control valve assembly as defined in claim 3, wherein said solenoid operated pilot valve unit comprises a unitary subcombination.

5. A control valve assembly as defined in claim 4, wherein said subcombination has a casing comprising a base section and cover section each having a pair of opposed inclined mating sides so that one wall of the base section is short thereby providing ready access to the solenoid operating parts when the cover section is removed, and an opposite wall of the base section is relatively elongated thereby providing a permanent mount for a fitting for the solenoid wiring.

6. A control valve assembly as defined in claim 5, wherein said casing comprises an O-ring disposed between the periphery of said base and cover sections sealing the lines of juncture between said casing sections.

7. A control valve assembly as defined in claim 5, wherein captive screws are provided in one of said casing sections for securing them together thereby preventing loss of said screws when the cover section is removed.

8. A pilot valve for use in a control valve assembly comprising: a base section adapted to be secured to a fluid control valve and having a through bore in said base section one end of which is adapted to communicate with a fluid inlet chamber provided in said control valve; first and second spaced annular inserts having opposed stepped through apertures, said inserts being disposed in said bore with the apertures thereof forming spaced inlet and exhaust ports coaxially related in said bore; a resilient O-ring seat in each of said inserts disposed in said apertures in abutting relation to the respective oppositely facing step shoulders; a ball valve axially movable between said ring seats; an annular sleeve in said bore spaced from said second insert and having an O-ring mounted in its bore; an operating pin reciprocably sealingly mounted in said third mentioned O-ring to seal the other end of said through bore; operating means for reciprocating said pin in opposition to the fluid pressure at said one end of said through bore to normally seat said ball in said first O-ring and selectively permit it to seat in said second O-ring under influence of said fluid pressure; a first passage in said base section connecting the space between said first and second O-rings with a fluid pressure piston chamber provided in said control valve; a second passageway in said base section connecting the space between said second insert and said annular sleeve to an exhaust chamber provided in said fluid valve.

9. A pilot valve as defined in claim 8, wherein said pin operating means comprises: an operating lever hingedly mounted on said base adjacent the other end of said through bore and having an aperture therein receiving a section of said pin; a resilient O-ring on said pin section holding it in said lever aperture and providing an emergency pull-out permitting the connection between said lever and pin to be broken in the event the pin sticks while the lever is being actuated.

10. In combination; a control valve body having opposite end faces, a main bore opening through said end faces, an inlet chamber opening through said end faces and a plurality of fluid control ports communicating with said main bore, including an inlet port communicating with said inlet chamber; a movable control element having a predetermined control position and comprising a valve spool slidably mounted in said main bore and providing axial passages for selectively alternately placing predetermined body ports in communication with said inlet port or venting said ports by alternate positioning of said spool, said spool being positioned in its various positions solely by the controlled pressure fluid and having a primary pressure responsive surface at one end of said main bore adapted upon selective pressurization to effect actuation of said valve spool, a secondary pressure responsive face at the other end of said bore of smaller area than said primary pressure responsive face adapted when pressurized to provide a shifting force to return said spool to its predetermined control position and inlet port cut-off means operably cooperating with said inlet port in passage of said spool between its alternate positions; a pilot valve assembly mounted on said valve body end face at said one end of said main bore and having a pilot valve, an abutment face, a normally closed pilot valve controlled passage the opposite ends of which open through said abutment face in position to respectively communicate with the adjacent ends of said inlet chamber and said end of said main bore and a normally open branch vent passage; a sealing gasket disposed between said pilot valve abutment face and said one valve body end face, said gasket having spaced apertures therein which provide respective communicating passageways between the opposite ends of said valve controlled passage and said inlet chamber and said end of said main bore whereby upon operation of the pilot valve in said pilot valve controlled passage said primary pressure responsive surface can be selectively subjected to the fluid pressure in said inlet chamber through said normally closed valve controlled passage or vented through said normally open branch vent passage to effect alternate positioning of said valve spool; and cover means for said other end of said valve body.

11. A three-way fluid control valve comprising: a valve body having interior walls defining a bore; three annular liner elements coaxially disposed in said bore and defining a segmented cylindrical guide bore therein, said liner elements having juxtaposed ends of reduced diameter; perforated cylindrical elements telescopingly receiving said liner ends and spacing the liners to define annular ports therebetween; an inlet and an exhaust port in said valve body, each communicating with said guide bore through one of the respective annular ports between said liners; packing rings resiliently supporting and sealing said liners in said bore; a fluid distributing port communicating with the interior of said intermediate liner element through apertures therein; a movable control element coaxially disposed in said segmented guide bore with means thereon to selectively establish and interrupt communication between said fluid distributing port and said inlet and exhaust ports and having a selectively pressurized pressure responsive area at one end only of said control element; an exhaust metering screw controlling the area size of said exhaust port; and means operable to move said control element comprising at least one pilot valve adapted to selectively apply fluid under pressure to said one end of said movable control element.

12. A valve assembly for use in controlling the flow of actuating fluid in a servo-motor system or the like comprising a main valve body having an inlet port; an exhaust port, fluid supply and return port means arranged and adapted to be selectively placed in communication with said inlet port and said exhaust port by alternate positioning of a control element; a control element having opposed piston sections of different effective area adapted to position said control element in one or the other of its two extreme positions and passage means for alternately connecting said supply and return port means to said inlet and said exhaust ports in accord with the alternate positioning of said control element in one or the other of its two extreme positions; a pilot valve unit mounted on said main valve body comprising a two way valve means, a first passage communicating said inlet port with said large area piston section through said valve means, a second passage communicating said larger area piston section with said exhaust port through said valve means and normally deenergized solenoid means adapted to maintain said valve means in one of its positions and, upon selective energization, to move said valve means to its other position to thereby shift said control element; and means for communicating said inlet port with said smaller area piston section at least when said solenoid means is deenergized to normally bias said control element to a selected one of its extreme positions.

References Cited in the file of this patent

UNITED STATES PATENTS

| | | |
|---|---|---|
| 630,380 | Mann | Aug. 8, 1899 |
| 1,258,164 | Stuart | Mar. 5, 1918 |
| 1,350,438 | Davidson | Aug. 24, 1920 |
| 1,394,679 | Johns | Oct. 25, 1921 |
| 1,648,419 | Meyer | Nov. 8, 1927 |
| 1,907,538 | Hanna | May 9, 1933 |
| 1,927,780 | Anderson | Sept. 19, 1933 |
| 1,952,690 | Storm | Mar. 27, 1934 |
| 2,010,329 | Speth | Aug. 6, 1935 |
| 2,094,926 | Nutter | Oct. 5, 1937 |
| 2,205,788 | Camerota | June 25, 1940 |
| 2,366,044 | McCune | Dec. 26, 1944 |
| 2,429,007 | Wilske et al. | Oct. 14, 1947 |
| 2,448,557 | Stephens | Sept. 7, 1948 |
| 2,456,355 | Aber | Dec. 14, 1948 |
| 2,570,450 | Hottenroth | Oct. 9, 1951 |
| 2,624,585 | Churchill | Jan. 6, 1953 |
| 2,632,341 | Arp | Mar. 24, 1953 |
| 2,660,196 | Miller | Nov. 24, 1953 |
| 2,693,823 | Sogge | Nov. 9, 1954 |
| 2,696,196 | Adams | Dec. 7, 1954 |
| 2,699,756 | Miller | Jan. 18, 1955 |
| 2,732,860 | Ray | Jan. 31, 1956 |
| 2,743,897 | Elliott | May 1, 1956 |
| 2,765,808 | Tydeman | Oct. 9, 1956 |
| 2,808,120 | Hunter | Oct. 1, 1957 |
| 2,826,178 | Krapf | Mar. 11, 1958 |
| 2,833,308 | Berry | May 6, 1958 |
| 2,861,592 | Collins | Nov. 25, 1958 |

UNITED STATES PATENT OFFICE
CERTIFICATE OF CORRECTION

Patent No. 2,993,511            July 25, 1961

Clarence Johnson

It is hereby certified that error appears in the above numbered patent requiring correction and that the said Letters Patent should read as corrected below.

Column 2, line 40, after "improved" insert -- pilot --; column 13, lines 31 and 32, strike out "to and maintaining said servo motor system".

Signed and sealed this 9th day of January 1962.

(SEAL)
Attest:

ERNEST W. SWIDER
Attesting Officer

DAVID L. LADD
Commissioner of Patents